(12) United States Patent
Chitrapu

(10) Patent No.: US 7,251,488 B2
(45) Date of Patent: Jul. 31, 2007

(54) METHOD AND SYSTEM FOR COORDINATING SERVICES IN INTEGRATED WLAN-CELLULAR SYSTEMS

(75) Inventor: Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 800 days.

(21) Appl. No.: 10/600,905

(22) Filed: Jun. 20, 2003

(65) Prior Publication Data

US 2004/0002330 A1    Jan. 1, 2004

Related U.S. Application Data

(60) Provisional application No. 60/392,594, filed on Jun. 28, 2002.

(51) Int. Cl.
*H04Q 7/20* (2006.01)
(52) U.S. Cl. .................. 455/436; 445/442; 370/331
(58) Field of Classification Search ............... 455/445, 455/436, 439, 552.1, 553.1
See application file for complete search history.

(56) References Cited

U.S. PATENT DOCUMENTS

| 5,384,827 | A | 1/1995 | Orikasa |
| 5,751,708 | A | 5/1998 | Eng et al. |
| 5,875,185 | A * | 2/1999 | Wang et al. ............ 370/331 |
| 6,243,581 | B1 | 6/2001 | Jawanda |
| 6,264,561 | B1 | 7/2001 | Saffari et al. |
| 6,549,768 | B1 * | 4/2003 | Fraccaroli ............ 455/456.3 |
| 6,889,045 | B2 * | 5/2005 | Pan et al. .............. 455/436 |
| 7,020,466 | B2 * | 3/2006 | Fujii ..................... 455/433 |
| 2003/0118015 | A1 * | 6/2003 | Gunnarsson et al. ...... 370/389 |
| 2004/0008645 | A1 * | 1/2004 | Janevski et al. .......... 370/331 |

FOREIGN PATENT DOCUMENTS

| CN | 1209926 A | 10/1997 |
| KR | 1999-72680 | 9/1999 |
| WO | 01/22662 | 8/2000 |

* cited by examiner

*Primary Examiner*—Creighton Smith
(74) *Attorney, Agent, or Firm*—Volpe and Koenig, P.C.

(57) ABSTRACT

User traffic and signaling/control data are routed in wireless systems having an integrated wireless local area network and cellular network. The signaling/control data may include an alert of an incoming mobile terminated session that is transmitted to the user equipment based on the type of user equipment and the level of integration. User traffic is also routed to the user equipment based on the type of user equipment and the level of integration.

21 Claims, 8 Drawing Sheets

SCENARIO-C0

— USER TRAFFIC
····· SIGNALING/CONTROL

METHOD AND SYSTEM FOR COORDINATING SERVICES IN INTEGRATED WLAN-CELLULAR SYSTEMS

CROSS REFERENCE TO RELATED APPLICATION

This application claims priority from U.S. Provisional Application No. 60/392,594, filed on Jun. 28, 2002, which is incorporated by reference as if fully set forth.

BACKGROUND

The present invention relates to integrated wireless local area networks (WLAN)-cellular systems. More specifically, the invention relates to the implementation of mobile terminated processes that are affected by the level of integration of a joint WLAN-cellular system.

WLAN-cellular systems include classes of terminals and network coordination. This classification is similar to coordination of circuit switched (CS) and packet switched (PS) domain services in General Packet Radio Service (GPRS).

In certain geographical areas, there may be both WLAN and cellular coverage as depicted in FIG. 1. In FIG. 1, WLAN service is available in area A, cellular service in area C, and both services in area B. User equipment (UE) will be capable of supporting both WLAN and cellular modems, and will have varying capabilities of multiple-mode operation.

Mobile-originated processes are not affected by the level of integration of the joint WLAN-cellular system. However, mobile terminated processes are affected by the integration level, including UE alerting (or paging) of an incoming mobile terminated session/call and the routing of user traffic to a UE. A method and system is therefore needed for implementing mobile-terminated processes.

SUMMARY

The invention is a method and system for implementing mobile terminated processes affected by the level of integration of joint WLAN-cellular systems for various user-network scenarios.

BRIEF DESCRIPTION OF THE DRAWING(S)

DETAILED DESCRIPTION OF THE PREFERRED EMBODIMENT(S)

By way of introduction, a user equipment (UE) as used herein includes, but is not limited to, wireless transmit/receive units (WTRU), mobiles, mobile stations, computers having wireless capability (either built-in or connected thereto), fixed or mobile subscriber units, pagers, or any other devices capable of operating in any type of wireless environment. Exemplary types of wireless environments include but are not limited to WLANs, cellular networks, and public land mobile networks (PLMNs). Furthermore, a UE may be coupled with a computer for convenience (eg. bigger keypad) and/or may have embedded processors for performing whatever computing functions are desired.

When referred to hereafter, a base station (BS) includes but is not limited to a Node-B, site controller, or any other type of interfacing device in a wireless environment.

Figure 1:
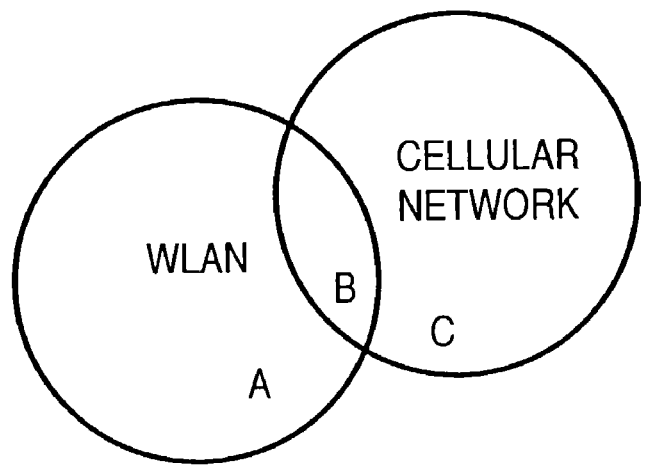
FIG. 1 is a diagram showing coverage areas for a joint WLAN-cellular system.

With joint WLAN-cellular systems (i.e. WLANs and cellular networks having at least one overlapping coverage area as shown in FIG. 1), there are two essential mobile terminated processes affected by the integration level of a particular joint WLAN-cellular system. The two essential processes are UE alerting (or paging) of an incoming session/call and establishing sessions (i.e., routing user traffic) to the UE. The methods and systems described herein provide various options for implementing these two processes, but may also be used for implementing any type of mobile terminated process.

UEs typically have at least two communication modes, an idle mode and an active mode. In the idle mode, the UE does not send or receive user traffic data, but is only capable of sending and receiving signaling and control messages such as, for example, broadcast and paging messages to and from the network. In the active mode, the UE is capable of sending and receiving user traffic data and may also send and receive signaling and control messages.

In accordance with the present invention, UEs are defined by class. The classification of UEs parallels GPRS UE classification for circuit and packet services and includes three classifications: class-A, class-B, and class-C. A class-A UE is capable of simultaneously being in WLAN-active mode as well as cellular-active mode. That is, a class-A UE is capable of simultaneously sending and receiving data on both WLAN and cellular radio channels. A class-B UE is capable of simultaneously being in WLAN-idle mode and cellular-idle mode. However, a class-B UE can only be in either WLAN-active mode or cellular-active mode, but not both simultaneously. That is, a class-B UE is capable of sending and receiving signaling and control messages simultaneously from both WLAN and cellular networks, but at any point in time can only send and receive user traffic data on either WLAN radio channels or cellular radio channels and not both. A class-C UE is capable of being either in the WLAN mode or cellular mode, but not both simultaneously (during idle or active modes).

Such classes support a third communication mode, hereinafter referred to as an "off mode," whereby hard power is removed from the circuitry of the UE which supports communications with one of the two network types (i.e. WLAN or cellular), while allowing the circuitry of the UE which supports communications with the other network type to remain powered (either idle or active), in accordance with one embodiment of the present invention. The off mode reduces the energy consumption of the UE, and thus extends and enhances battery life.

Implementation of the off mode varies according to classification and level of integration. In general, a UE may be off with respect to a first network and idle or active with respect to a second network. Despite being off with respect to the first network, the UE may be notified of an incoming "first-network" transmission by way of a signaling/control connection between the two networks (i.e. Level-1 integration and above, as described below). Upon notification, the UE may, according to its capabilities as defined by its classification, activate itself with respect to the first network and receive the transmission. Where there is Level-2 integration, the UE has the additional option of simply receiving the transmission over the second network. Of course, the UE will have to be active with respect to whichever network is being used to receive the transmission.

The integration of the WLAN and cellular networks is defined by integration level. Level-0 integration means there is no connection between the WLAN and cellular network for exchanging call/session set-up related signaling/control information. There may, however, be a connection for exchanging customer management related signaling/control information, such as authentication, authorization and accounting (AAA) functions. There is also no connection for exchanging user traffic data. Level-1 integration means there is a connection between the WLAN and cellular network for exchanging call/session set-up related signaling/control information. There is, however, no connection for exchanging user traffic data. Level-2 integration means there is a connection between the WLAN and cellular network for exchanging call/session set-up related signaling and control information. There is also a connection for exchanging user traffic data.

The following User-Network scenarios result by considering the various combinations of UE Classes and Network Integration Levels described above.

|  | Class-A UE | Class-B UE | Class-C UE |
| --- | --- | --- | --- |
| Level-0 Integration | Scenario-A0 | Scenario-B0 | Scenario-C0 |
| Level-1 Integration | Scenario-A1 | Scenario-B1 | Scenario-C1 |
| Level-2 Integration | Scenario-A2 | Scenario-B2 | Scenario-C2 |

Figure 2:
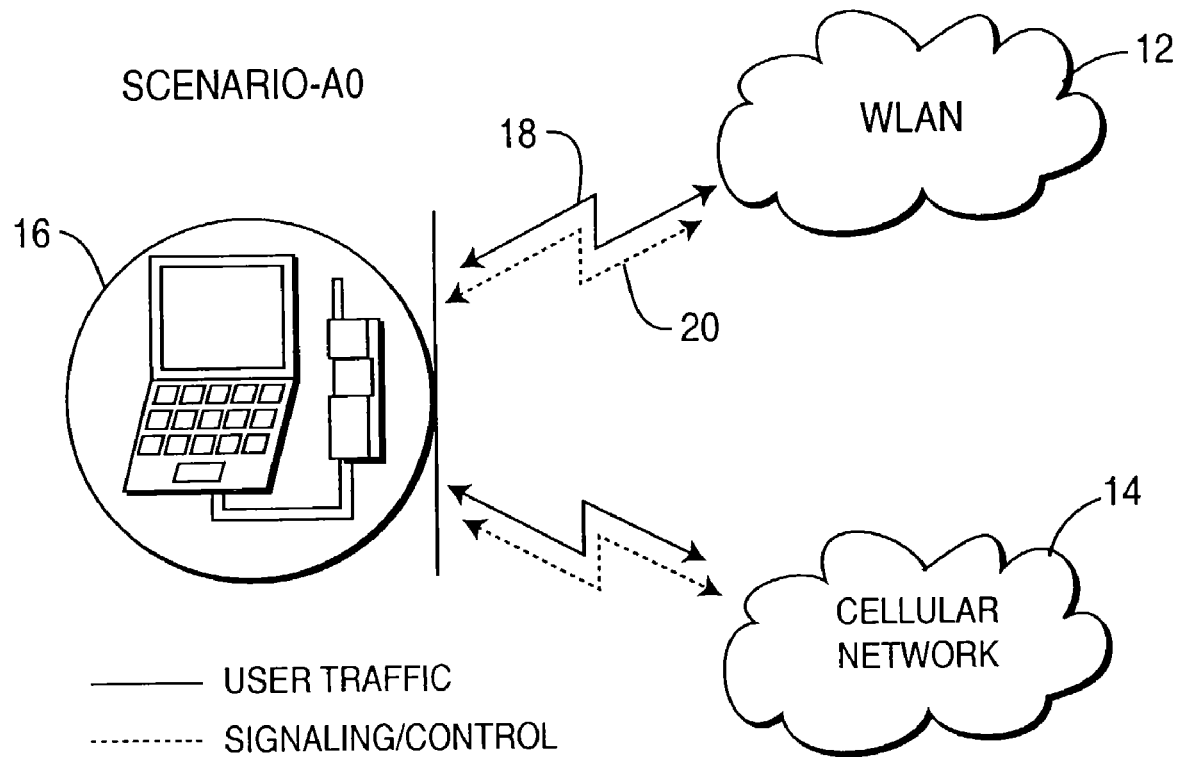
FIGS. 2 through 4 are wireless systems having User-Network scenarios A0 through A2, in accordance with an embodiment of the present invention.

Referring initially to FIG. 2, User-Network scenario A0 of a joint WLAN-cellular system is shown. The WLAN, cellular network, and UE are designated 12, 14, and 16, respectively. As previously mentioned, class-A UE is capable of being simultaneously in WLAN-active mode as well as cellular-active mode. In User-Network scenario-A0, a user traffic connection 18 and signaling/control connection 20 exists between the UE 16 and each of the networks 12, 14.

When the UE 16 is idle with respect to the cellular network 14 and the WLAN 12, the cellular network 14 and WLAN 12 can alert and establish sessions to the UE 16 in uncoordinated independent ways using the respective traffic and signaling radio channels. That is, in scenario-A0, if a UE operating in the cellular network receives an incoming WLAN 12 transmission, the WLAN 12 must notify the UE 16 independent of the cellular network 14 and vice versa. In this scenario, because the UE 16 is of class-A (i.e. capable of being active with respect to both networks), when the UE 16 is active with respect to the WLAN 12 and idle with respect to the cellular network 14, the cellular network 14 can independently alert and establish sessions to UE 16. Similarly, when the UE 16 is active with respect to the cellular network 14 and idle with respect to the WLAN 12, the WLAN 12 can independently alert and establish sessions to UE 16.

Figure 3:
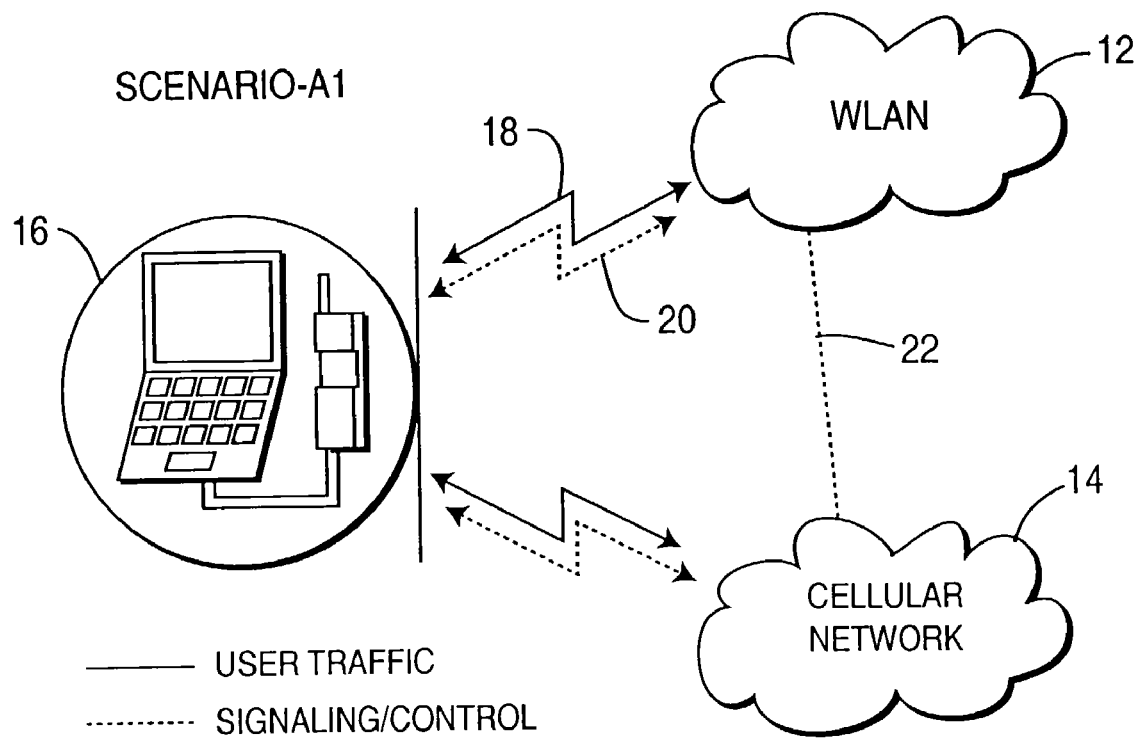

Referring now to FIG. 3, User-Network scenario A1 is shown. Scenario A1 includes the same class of UE 16 (class A) as in scenario A0, but has a higher level of integration. Scenario A1 is considered to have a higher level of integration than scenario A0 because a signaling/control connection 22 exists between the WLAN 12 and the cellular network 14.

In this scenario, when the UE 16 is idle with respect to both the cellular network 14 and the WLAN 12, both of the networks 12, 14 can alert the UE 16 in a coordinated way using the signaling connection 22 between the WLAN 12 and cellular network 14, or independently in an uncoordinated way. The WLAN 12 and cellular network 14, however, have to establish sessions (i.e. route user traffic) independently through their respective networks because while there is a signaling/control connection 22 between the two networks 12, 14, there is no user traffic connection.

When the UE 16 is idle with respect to the cellular network 14 and active with respect to the WLAN 12, the cellular network 14 can alert the UE 16 via the WLAN 12 radio channels using the signaling connection 22 between the WLAN 12 and the cellular network 14, or independently in an uncoordinated way. In this scenario, the signaling can be embedded within the traffic being sent by the cellular network 14 or it can be sent separately on WLAN 12 signaling channels. Again, because there is no user traffic connection, the cellular network 14 has to establish sessions independently through the cellular network 14. That is, when UE 16 is active or otherwise operating in the WLAN 12 (i.e. sending/receiving data for example) and receives an incoming cellular transmission the UE 16 does not have the option of receiving the transmission over the WLAN 12. Instead, if the UE 16 wishes to receive the transmission the UE 16 must switch to cellular 14 mode. From a user's perspective the switch to cellular 14 mode is similar to switching from one call to another using call waiting in a public switched telephone network (PSTN).

When the UE 16 is active with respect to the cellular network 14 and idle with respect to the WLAN 12, the WLAN 12 can alert the UE 16 via the cellular network 14 radio channels using the signaling connection 22 between WLAN 12 and the cellular network 14 or independently in an uncoordinated way. In this case, the signaling can be embedded within the traffic being sent by the WLAN 12 or it can be sent separately on WLAN signaling channels. The WLAN 12 has to establish sessions independently through the WLAN 12, as explained above with respect to the cellular network 14, because there is no user traffic connection.

Figure 4:
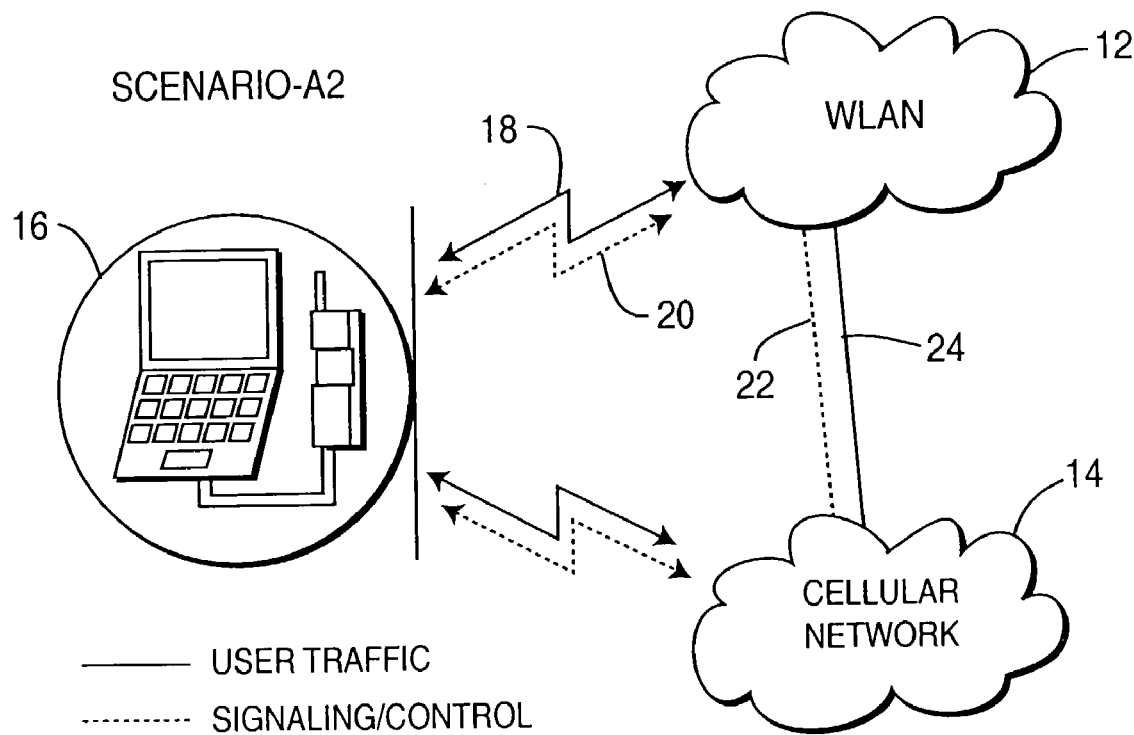

Referring now to FIG. 4, User-Network scenario-A2 is shown. In this scenario, the UE 16 is again of class-A, but the level of integration is higher than in scenario A1. The level of integration is higher because in scenario-A2 there is not only a signaling/control connection 22 between the two networks, but also a user traffic connection 24. When the UE 16 is idle with respect to the cellular network 14 and WLAN 12, the WLAN 12 and cellular network 14 can alert the UE 16 in a coordinated way using the signaling connection 22 between the WLAN 12 and cellular network 14, or independently in an uncoordinated way. The WLAN 12 can establish sessions via the cellular network 14. Similarly, the cellular network 14 can establish sessions via the WLAN 12. They may also establish sessions independently through their respective networks.

When the UE 16 is idle with respect to the cellular network 14 and active with respect to the WLAN 12, the cellular network 14 can alert the UE via the WLAN 12 radio channels using the signaling connection 22 between the WLAN 12 and cellular network 14, or independently in an uncoordinated way. The cellular network 14 can establish sessions via the WLAN 12 or independently through the cellular network 14. That is, in this scenario, the UE 16 may receive an incoming cellular network 14 transmission over the cellular network 14 or over the WLAN 12, as desired. This situation is also similar to using call waiting in PSTNs, but here users may choose which network they want to receive the transmission on. It should be noted the use of call waiting is used purely by way of example for purposes of explaining the invention.

Similarly, when the UE 16 is active with respect to the cellular network 14 and idle with respect to the WLAN 12, the WLAN 12 can alert the UE 16 via the cellular network 14 radio channels using the signaling connection 22 between WLAN 12 and cellular network 14, or independently in an uncoordinated way. The WLAN 12 can establish sessions via the cellular network 14 or independently through the WLAN 12. That is, in this scenario, the UE 16 may also receive an incoming WLAN 12 transmission over the WLAN 12 or over the cellular network 14, as desired.

Figure 5:
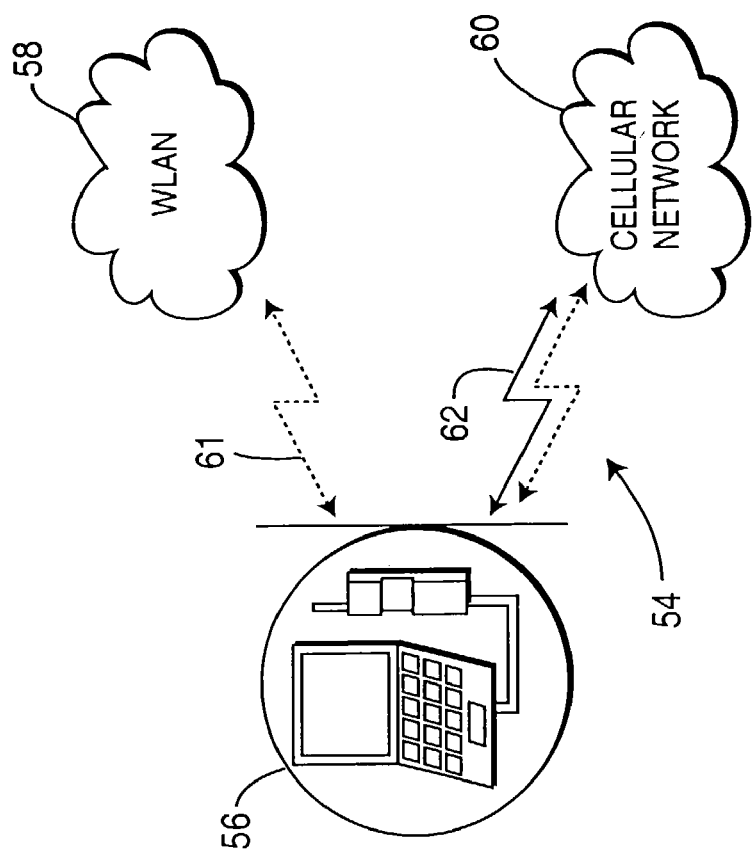
FIGS. 5 through 7 are wireless systems having User-Network scenarios B0 through B2, in accordance with an embodiment of the present invention.
Figure 5:
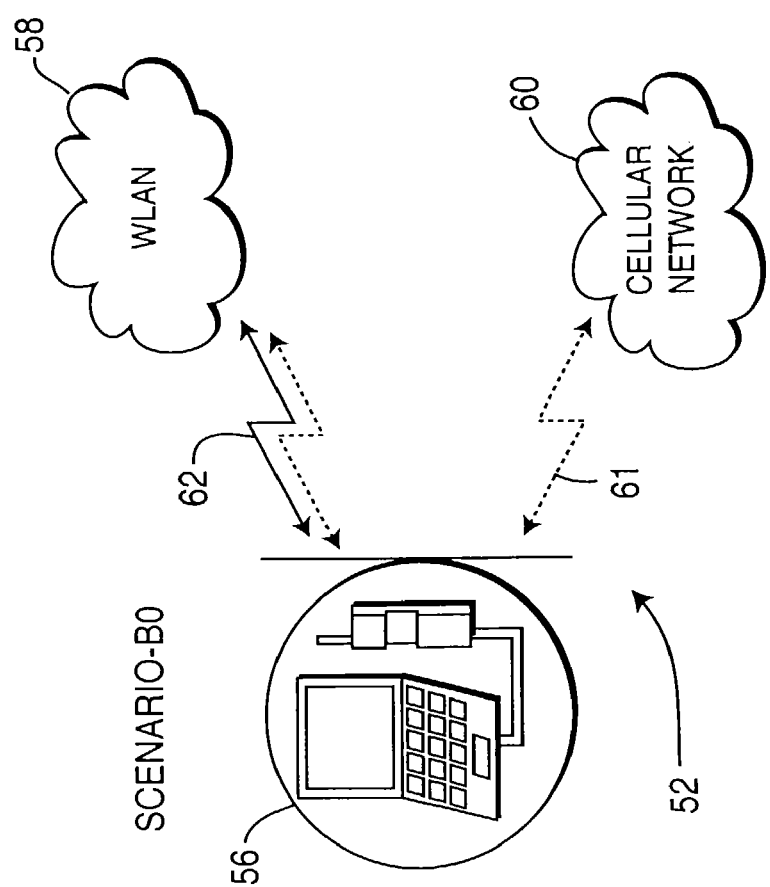

Referring now to FIG. 5, User-Network scenario B0 is shown. In scenarios B0-B2, the UE is of class-B and consequently each of these scenarios includes two sub-scenarios 52, 54. Each sub-scenario comprises UE 56, a WLAN 58, and a cellular network 60.

A class-B UE can be in cellular network-idle mode and WLAN-idle mode simultaneously, but can only be in one of the cellular-active and WLAN-active modes. Although signaling and control connections (for purposes of UE alerting) exist between the UE 56 and both of the networks 58, 60, traffic session connections can only be established with one network at a time. In sub-scenario 52, there is a user traffic connection 62 between the UE 56 and the WLAN 58. In sub-scenario 54, there is a user traffic connection 62 between the UE 56 and the cellular network 60. Both sub-scenarios include a signaling/control connection 61 between the UE 56 and each of the networks 58, 60.

When the UE 56 is idle with respect to the cellular network 60 and the WLAN 58, the WLAN 58 and cellular network 60 can alert the UE 56 in uncoordinated independent ways using the respective traffic and signaling radio channels. Due to UE 56 capability restrictions, sessions can be established with only one of the two networks.

When the UE 56 is idle with respect to the cellular network 60 and active with respect to the WLAN 58, the cellular network 60 can independently alert the UE 56 because the UE 56 is of Class-B, but cannot establish a session due to UE limitations (i.e. a class-B UE can only be in one active mode at a time). The UE 56 may, however, choose to drop the WLAN session and accept the cellular session.

When the UE 56 is active with respect to the cellular network 60 and idle with respect to the WLAN 58, the WLAN 58 can independently alert the UE 56 because the UE 56 is of Class-B, but cannot establish a session due to UE limitations. The UE 56 may, however, choose to drop the cellular session and accept the WLAN session.

Figure 6:
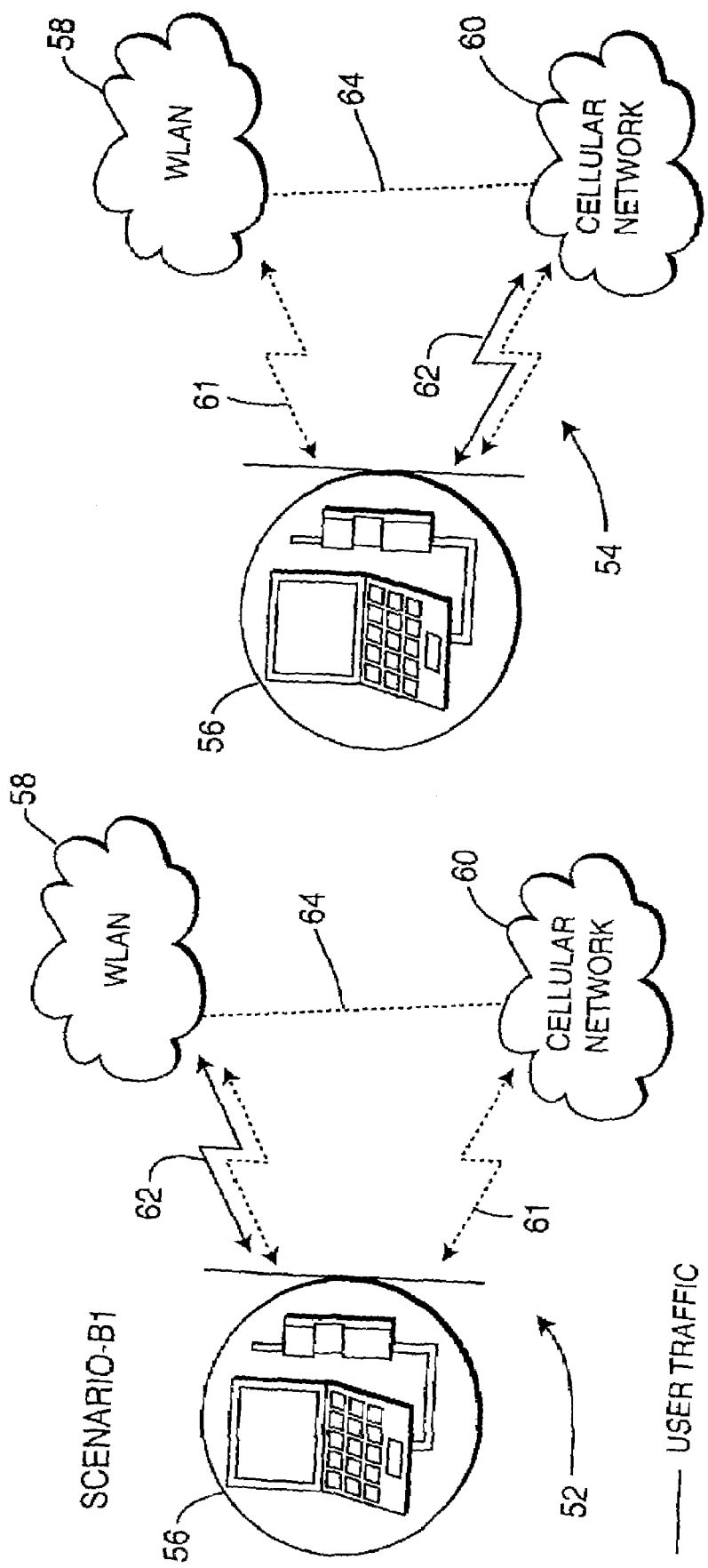

Referring now to FIG. 6, User-Network scenario B1 is shown. Network scenario B1 is the same as scenario B0, but includes a higher level of integration in that there is a signaling/control connection 64 between the WLAN 58 and the cellular network 60. In this scenario, when the UE 56 is idle with respect to the WLAN 58 and the cellular network 60, the WLAN 58 and cellular network 60 can alert the UE 56 in a coordinated way using the signaling connection 64 between the WLAN 58 and cellular network 60, or independently in an uncoordinated way. Due to UE capability restrictions, sessions can be established with only one of the two networks 58, 60.

When the UE 56 is idle with respect to the cellular network 60 and active with respect to the WLAN 58, the cellular network 60 can alert the UE 56 via the WLAN 58 radio channels using the signaling connection 64 between the WLAN 58 and the cellular network 60, or independently in an uncoordinated way. The cellular network 60, however, cannot establish a session, unless the UE 56 decides to terminate the WLAN 58 session.

When the UE 56 is active with respect to the cellular network 60 and idle with respect to the WLAN 58, the WLAN 58 can alert the UE 56 via the cellular network 60 radio channels using the signaling connection 64 between the WLAN 58 and the cellular network 60, or independently in an uncoordinated way. The WLAN 58, however, cannot establish a session, unless the UE 56 decides to terminate the cellular session.

Figure 7:
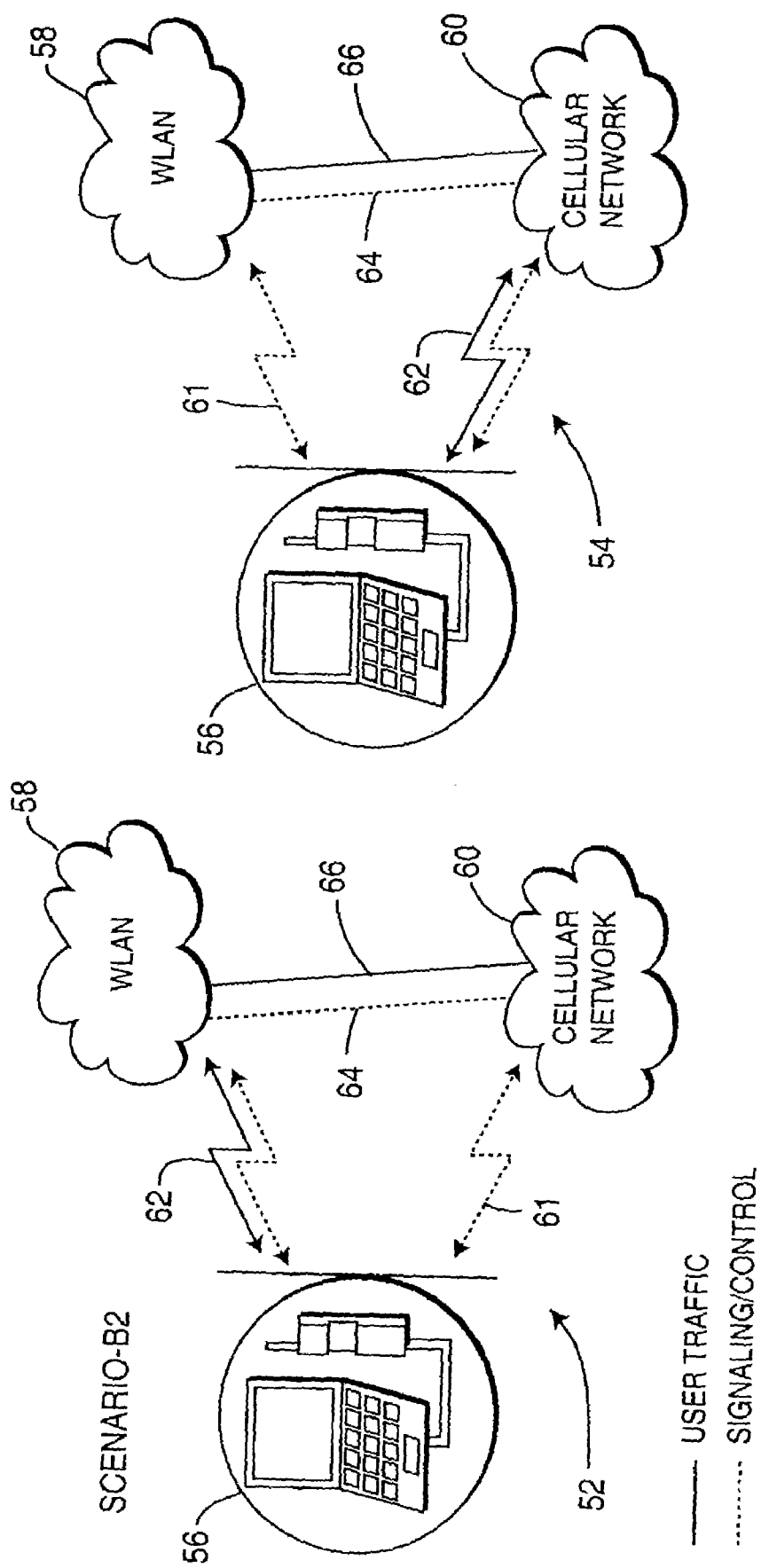

Referring now to FIG. 7, User-Network scenario-B2 is shown. User-Network scenario-B2 is the same as B1, but has a higher level of integration in that a user traffic connection 66 exists between the two networks (in both sub-scenarios 52, 54).

When the UE 56 is idle with respect to the cellular network 60 and the WLAN 58, the WLAN 58 and cellular network 60 can alert the UE 56 in a coordinated way using the signaling connection 64 between the WLAN 58 and the cellular network 60, or independently in an uncoordinated way. Due to UE 56 capability restrictions, sessions can be established with only one of the two networks 58, 60. Since there is a user traffic connection 66 between the WLAN 58 and cellular network 60, the user session may be established via either one of the two networks 58, 60. The selection may be based on a number of criteria, such as for example, QoS and security.

When the UE 56 is idle with respect to the cellular network 60 and active with respect to the WLAN 58, the cellular network 60 can alert the UE 56 via the WLAN 58 radio channels using the signaling connection 64 between WLAN 58 and cellular network 60, or independently in an uncoordinated way. The cellular network 60, however, cannot establish a session, unless the UE 56 decides to terminate the WLAN 58 session. If so, an 'optimal' network may be chosen for establishing the cellular-session.

When the UE 56 is active with respect to the cellular network 60 and idle with respect to the WLAN 58, the WLAN 58 can alert the UE 56 via the cellular network 60 radio channels using the signaling connection 64 between the WLAN 58 and cellular network 60, or independently in an uncoordinated way. The WLAN 58, however, cannot establish a session, unless the UE 56 decides to terminate the cellular session. If so, an 'optimal' network may be chosen for establishing the cellular-session.

Figure 8:
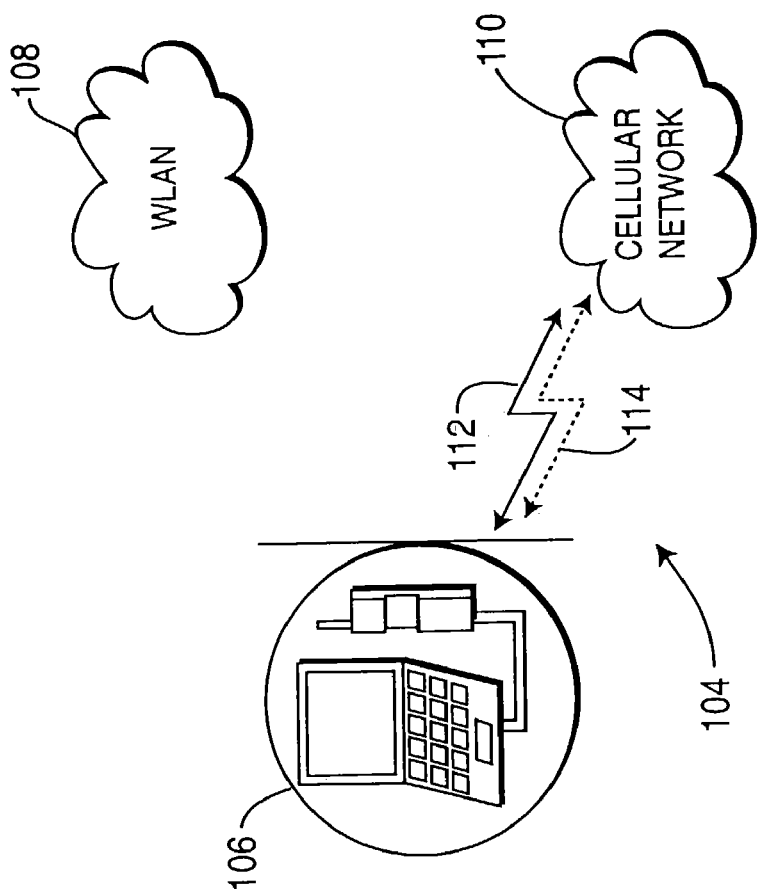
FIGS. 8 through 10 are wireless systems having User-Network scenarios C0 through C2, in accordance with an embodiment of the present invention.
Figure 8:
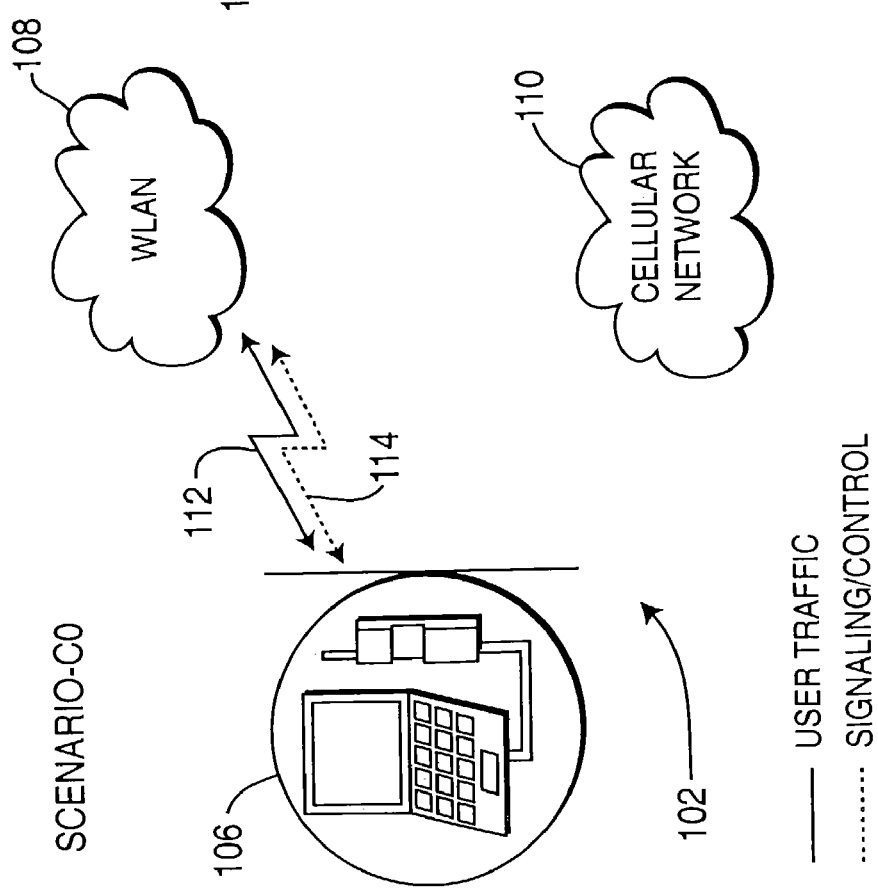

Referring now to FIG. 8, User-Network scenario-C0 is shown. In this scenario the UE is class-C meaning it is capable of being either in the WLAN mode or the cellular mode, but not both simultaneously during either idle or active modes. Scenarios C0-C2, therefore, like scenarios B0-B2, include two sub-scenarios 102, 104. In sub-scenario 102 of scenario C0 100, there is a user traffic connection 112 and a signaling/control connection 114 between the UE 106 and the WLAN 108. In sub-scenario 104 of scenario C0, there is a user traffic connection 112 and a signaling/control connection 114 between the UE 106 and the cellular network 110. In scenario C0, mobile terminated sessions can be paged and established only by the network to which the UE is connected. Any incoming sessions to the other non-connected network cannot be completed.

Figure 9:
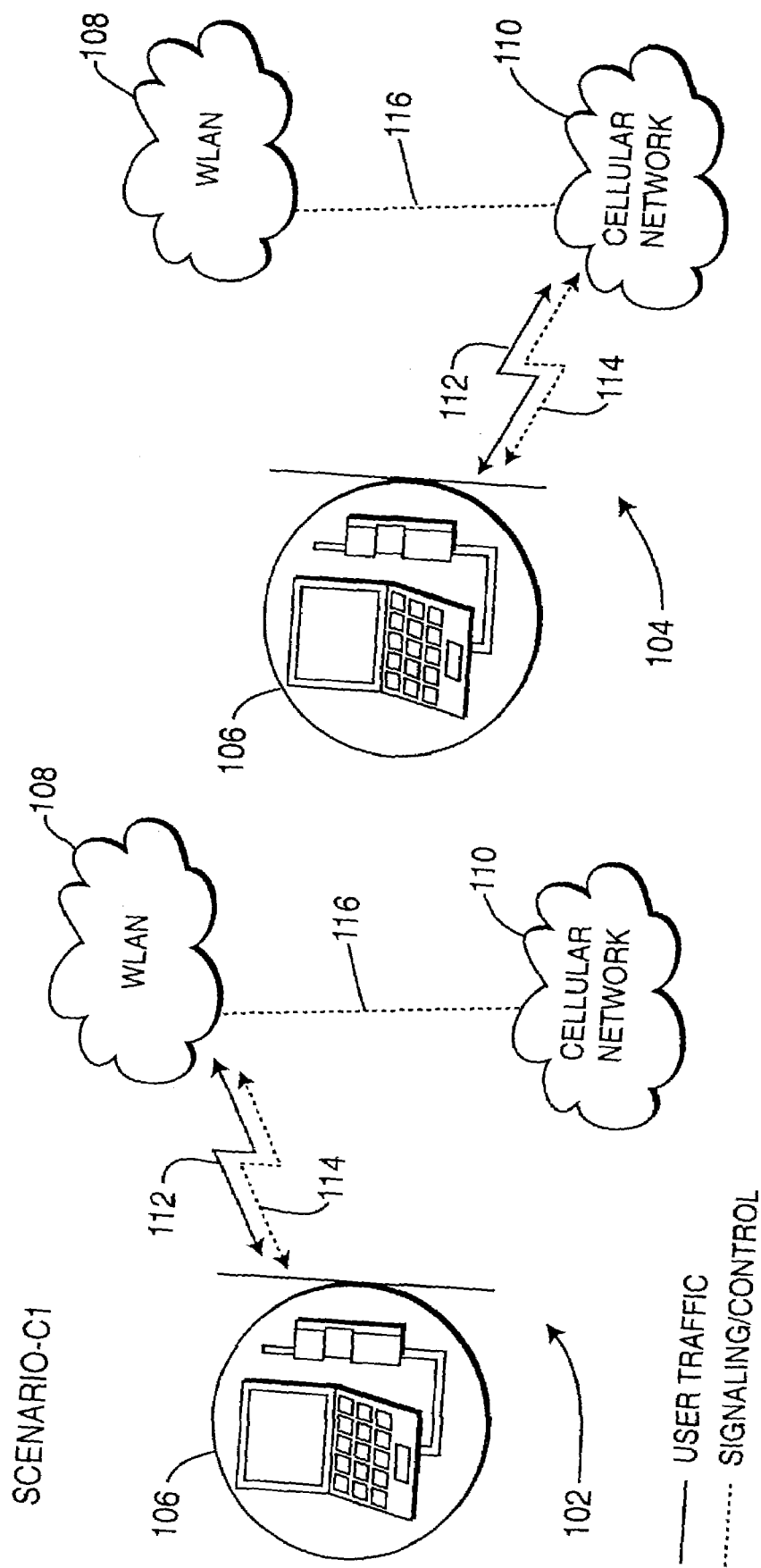

Referring now to FIG. 9, User-Network scenario-C1 is shown. This scenario is the same as scenario C0, but has a higher level of integration in that there is a signaling connection 116 between the networks 108, 110. When the UE 106 is idle and connected to the cellular network 108 (or WLAN 110), the WLAN 108 (or cellular network 110) can alert the UE 106 in a coordinated way using the signaling connection 116 between the WLAN 108 and cellular network 110. Due to UE 106 capability restrictions, sessions can be established with only one of the two networks 108, 110. If a session is to be established with the WLAN 108 (or cellular network 110), then the existing connection to the cellular network 110 (or WLAN 108) must be broken and a fresh connection must be setup to the WLAN 108 (or cellular network 110).

When the UE 106 is active and connected to the cellular network 110 (or WLAN 108), the WLAN 108 (or cellular network 110) can alert the UE 106 via the cellular network 110 radio channels using the signaling connection 116 between the WLAN 108 and cellular network 110. The WLAN 108 (or cellular network 110), however, cannot establish a session, unless the UE 106 decides to terminate the cellular (or WLAN) session. In such a case, the existing connection to the cellular network 110 (or WLAN 108) must be broken and a fresh connection must be setup to the WLAN 108 (or cellular network 110).

Figure 10:
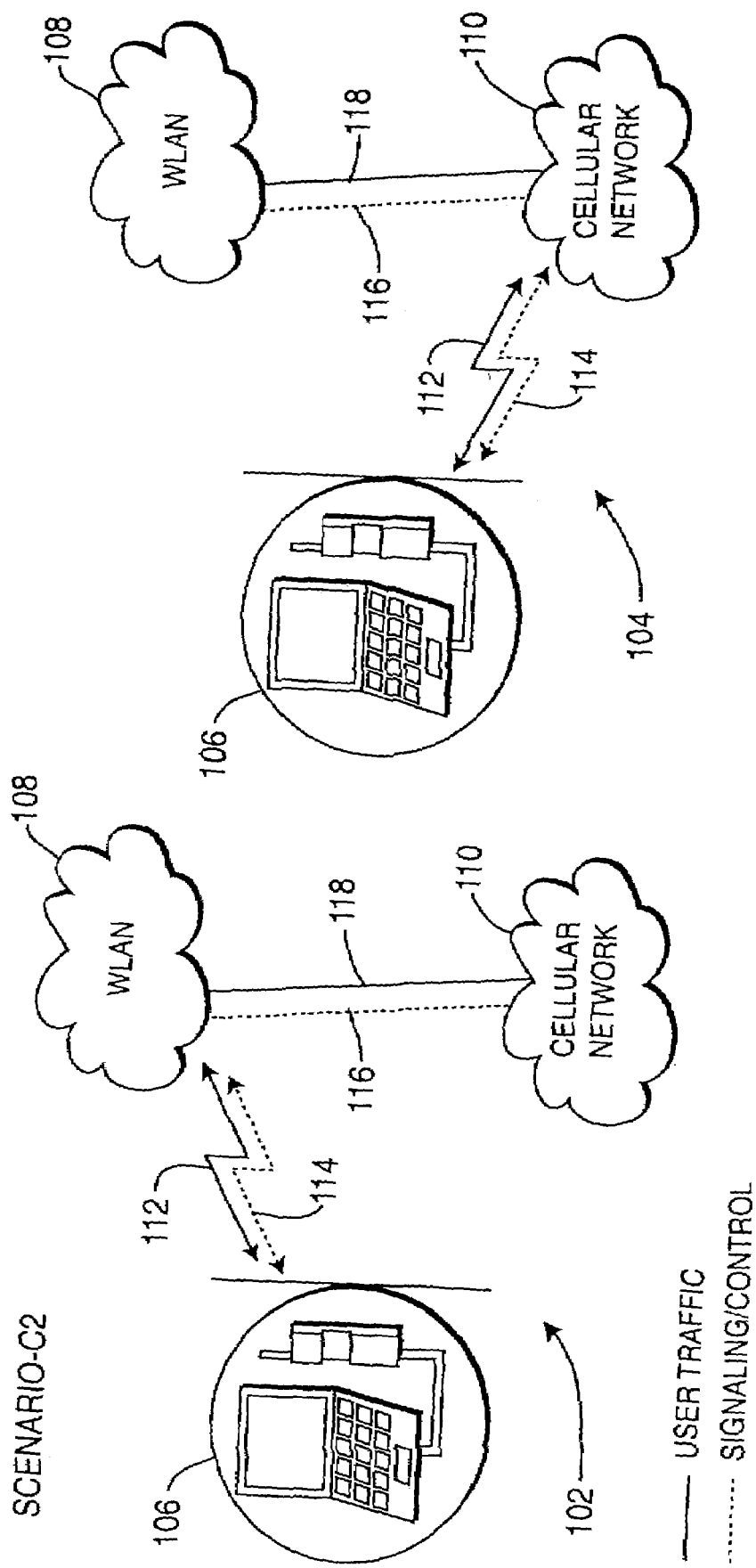

Referring now to FIG. 10, there is shown User-Network scenario-C2. This scenario is the same as scenario C1, but has a higher level of integration in that there is a user traffic connection 118 between the networks 108, 110. When the UE 106 is idle and connected to the cellular network 110 (or WLAN 108), the WLAN 108 (or cellular network 110) can alert the UE 106 in a coordinated way using the signaling connection 116 between the WLAN 108 and cellular network 110. Due to UE 106 capability restrictions, sessions can be established with only one of the two networks 108, 110. If a session is to be established with the WLAN 108 (or cellular network 110), then the existing connection to the cellular network 110 (or WLAN 108) may be broken and a fresh connection setup to the WLAN 108 (or cellular network 110). Alternately, the UE 106 may stay connected to the cellular network 110 (or WLAN 108) and the user traffic routed from the WLAN 108 (or cellular network 110) to the cellular network 110 (or WLAN 108). The choice between these alternatives may be made based on criteria, such as for example, QoS and security.

When the UE 106 is active and connected to the cellular network 110 (or WLAN 108), the WLAN 108 (or cellular network 110) can alert the UE 106 via the cellular network 110 radio channels using the signaling connection 116 between the WLAN 108 and cellular network 110. The WLAN 108 (or cellular network 110), however, cannot establish a session, unless the UE 106 decides to terminate the cellular (or WLAN) session. In such a case, the existing connection to the cellular network 110 (or WLAN 108) must be broken and a fresh connection must be setup to the WLAN 108 (or cellular network 110). Alternately, the UE 106 may stay connected to the cellular network 110 (or WLAN 108) and the user traffic routed from the WLAN 108 (or cellular network 110) to the cellular network 110 (or WLAN 108). The choice between these alternatives may be made based on criteria, such as for example QoS and security.

In another embodiment of the invention, an off mode may be utilized by a UE, as desired. Where there is at least Level-1 integration between a WLAN and cellular network, a UE may be "off" with respect to the WLAN and still be notified of an incoming WLAN transmission. Similarly, with Level-1 integration, a UE may be off with respect to the cellular network and still be notified of an incoming cellular network transmission. This is accomplished by way of the signaling/control connection that exists between the WLAN and cellular network where there is Level-1 integration thereof.

By way of example, referring again to scenario-A1 (FIG. 3), if the UE 16 is off with respect to the cellular network 14 and idle or active with respect to the WLAN 12, the cellular network 14 can alert the UE 16 via the WLAN 12 radio channels using the signaling/control connection 22 between the WLAN 12 and the cellular network 14. Upon receipt of the signals by the WLAN mode circuitry in the UE 16, the hard power may be manually or automatically restored to the cellular mode circuitry of the UE 16. This example is equally applicable where the UE 16 is off with respect to the WLAN 12 and idle or active with respect to the cellular network 14 (i.e. by replacing WLAN with cellular and cellular with WLAN).

By way of further example, reference is again made to scenario-A2 (FIG. 4) where there is Level-2 integration between networks. Here, if the UE 16 is off with respect to the cellular network 14 and idle or active with respect to the WLAN 12, the cellular network 14 may not only alert UE 16 as explained above, but also can forward actual traffic signals to the UE 16 via the WLAN 12 using the user traffic connection 24. Upon receipt of the signals by the WLAN mode circuitry in the UE 16, the hard power to the cellular mode circuitry of the UE 16 remains off, since it is not required for the UE 16 to respond to the traffic signals. By pressing a key on the UE 16, the user may manually select the mode (cellular or WLAN) by which to receive an incoming page or call. Furthermore, such a selection may be automatically executed using a process based on a predetermined set of criteria. Again, this example is equally applicable where the UE 16 is off with respect to the WLAN 12 and idle or active with respect to the cellular network 14 (i.e. by replacing WLAN with cellular and cellular with WLAN).

It should be noted that the present invention is applicable and may be implemented using any hybrid code division multiple access (CDMA)/time division multiple access (TDMA) communication system such as, for example, a third generation partnership program (3GPP) wideband code division multiple access (W-CDMA) system utilizing the time division duplex mode. Additionally, some embodiments are applicable to CDMA systems, in general, using beamforming, such as the proposed frequency division duplex (FDD) mode of 3GPP W-CDMA.

While the present invention has been described in terms of the preferred embodiment, other variations which are within the scope of the invention as outlined in the claims below will be apparent to those skilled in the art.

What is claimed is:

1. A method for coordinating services in an integrated wireless local area network and a cellular network system, the method comprising the steps of:

classifying types of wireless transmit and receive units (WTRUs) accessing the system according to the ability of the WTRUs to simultaneously access wireless local area networks and cellular networks;

identifying the level of integration between the wireless local area network and the cellular network;

transmitting an alert of an incoming mobile terminated session to the WTRU based on the type of WTRU and the level of integration; and routing user traffic to the WTRU based on the type of WTRU and the level of integration.

2. The method of claim 1 wherein:

the type of WTRU includes units capable of operating in a wireless local area network-active mode and cellular-active mode, whereby said units have a capability of simultaneously sending and receiving data on both wireless local area network and cellular radio channels;

the type of WTRU includes units capable of operating simultaneously in a wireless local area network-idle mode and cellular-idle mode, whereby said units have a capability of either wireless local area network-active mode or cellular-active mode, but not both simultaneously, said units capable of sending and receiving signaling and control messages simultaneously from both wireless local area networks and cellular networks, but capable of only sending and receiving user traffic data on one of a wireless local area network radio channel and a cellular radio channel; and the type of WTRU includes units capable of operating either in the wireless local area network mode or cellular mode, but not both simultaneously during both idle and active modes.

3. The method of claim 1, further comprising providing classifications of said level of integration, whereby Level-0 integration provides no connection between the wireless local area network and the cellular network for exchanging predetermined signaling and control information and no connection for exchanging user traffic data, Level-1 integration provides a connection between the wireless local area network and cellular network for exchanging the predetermined user signaling and control information and no connection for exchanging user traffic data, and Level-2 integration provides a connection between the wireless local area network and the cellular network for exchanging predetermined signaling and control information and also a connection for exchanging user traffic data.

4. The method of claim 3, wherein the predetermined signaling and control information includes call or session set-up related signaling and control information.

5. The method of claim 1, wherein:

if the type of the WTRU and the level of integration are such that the WTRU cannot receive information from at least one of the cellular network and the wireless local area network, one of the cellular network and the wireless local area network provides alerting information to the WTRU through the other of the cellular network and the wireless local area network according to availability of communications with the WTRU; and if the type of the WTRU and the level of integration are such that the WTRU receives information from both the cellular network and the wireless local area network, one of the cellular network and the wireless local area network provides alerting information to the WTRU.

6. The method of claim 1, wherein:

if the type of the WTRU and the level of integration are such that the WTRU cannot receive information from at least one of the cellular network and the wireless local area network, one of the cellular network and the wireless local area network provides alerting information to the WTRU through the other of the cellular network and the wireless local area network according to availability of communications with the WTRU;

if the type of the WTRU and the level of integration are such that the WTRU receives information from both the cellular network and the wireless local area network, the cellular network provides alerting information concerning communications from the cellular network to the WTRU; and if the type of the WTRU and the level of integration are such that the WTRU receives information from both the cellular network and the wireless local area network, the wireless local area network provides alerting information concerning communications from the wireless local area network to the WTRU.

7. The method of claim 1, further comprising, subsequent to receiving an alert, changing connection status according to a predetermined criteria, the predetermined criteria including quality of service.

8. A method for coordinating services in integrated wireless local area network and cellular network systems, the method comprising the steps of:

classifying types of wireless transmit and receive units (WTRUs) accessing the system according to the ability of the WTRU to simultaneously access wireless local area networks and cellular networks;

identifying the level of integration between the wireless local area network and the cellular network;

in the case of the WTRU providing simultaneous local area network services and cellular network services, transmitting an alert of an incoming mobile terminated session to the WTRU for shared services; and in the case of the WTRU providing local area network services and cellular network services without simultaneous functions, transmitting an alert of an incoming mobile terminated session to the WTRU for non-shared services; and routing user traffic to the WTRU based on the type of WTRU and the level of integration.

9. The method of claim 8, further comprising, in the case of the WTRU providing simultaneous local area network services and cellular network services when in an idle mode classifying the WTRU in accordance with an ability to operate simultaneously in the inactive mode, but in an active state of the WTRU, transmitting an alert of an incoming mobile terminated session to the WTRU for non-shared services.

10. The method of claim 9, wherein the transmitting an alert of an incoming mobile terminated session to the WTRU includes transmission of the alert for alerting the WTRU for indicating an incoming session and transmitting the alert for establishing sessions with the WTRU.

11. A network providing cellular telecommunications services having integrated wireless local area network and cellular network systems, the network comprising:

a configuration for classifying types of wireless transmit and receive units (WTRUs) accessing the system according to the ability of the WTRU to simultaneously access wireless local area networks and cellular networks;

a configuration for identifying the level of integration between the wireless local area network and the cellular network;

a configuration for transmitting an alert of an incoming mobile terminated session to the WTRU based on the type of WTRU and the level of integration; and a configuration for routing user traffic to the WTRU based on the type of WTRU and the level of integration.

12. The network of claim 11, wherein:

if the network provides a connection between the wireless local area network and cellular network for exchanging the predetermined user signaling and control information and no connection for exchanging user traffic data, the network provides alert information received from the wireless local network to WTRUs communicating with the cellular network system, and if the WTRU has a capability of directly receiving alert data, the network generating the alert data provides the alert data to the WTRU.

13. A method for coordinating services in integrated wireless local area network and cellular network systems, the method comprising the steps of:
classifying types of user equipment accessing the system according to the ability of the equipment to simultaneously access wireless local area networks and cellular networks;
identifying the level of integration between the wireless local area network and the cellular network;
transmitting an alert of an incoming mobile terminated session to the user equipment based on the type of user equipment and the level of integration; and
routing user traffic to the user equipment based on the type of user equipment and the level of integration.

14. A wireless communication system comprising:
a wireless local area network and a cellular network, the wireless local area network and the cellular network having at least one overlapping geographic coverage area;
at least one user equipment located within the geographic coverage area;
a signaling connection between the wireless local area network and the cellular network; and
a user traffic connection between the wireless local area network and the cellular network;
wherein the wireless local area network notifies the user equipment of an incoming wireless local area network transmission when the user equipment is idle with respect to the wireless local area network and active with respect to the cellular network by sending a message through the cellular network to the user equipment.

15. The system of claim 14 wherein the incoming transmission is transmitted through the cellular network to the user equipment.

16. The system of claim 14 wherein the user equipment is activated with respect to the wireless local area network and the incoming transmission is transmitted through the wireless local area network to the user equipment.

17. The system of claim 14 wherein the user equipment is off with respect to the wireless local area network.

18. A wireless communication system comprising:
a wireless local area network and a cellular network, the wireless local area network and the cellular network having at least one overlapping geographic coverage area;
at least one user equipment located within the geographic coverage area;
a signaling connection between the wireless local area network and the cellular network; and
a user traffic connection between the wireless local area network and the cellular network;
wherein the cellular network notifies the user equipment of an incoming cellular network transmission when the user equipment is idle with respect to the cellular network and active with respect to the wireless local area network by sending a message through the wireless local area network.

19. The system of claim 18 wherein the incoming transmission is transmitted through the wireless local area network to the user equipment.

20. The system of claim 18 wherein the user equipment is activated with respect to the cellular network and the incoming transmission is transmitted through the cellular network to the user equipment.

21. The system of claim 18 wherein the user equipment is off with respect to the cellular network.

* * * * *

UNITED STATES PATENT AND TRADEMARK OFFICE
CERTIFICATE OF CORRECTION

PATENT NO. : 7,251,488 B2  Page 1 of 1
APPLICATION NO. : 10/600905
DATED : July 31, 2007
INVENTOR(S) : Prabhakar R. Chitrapu It is certified that error appears in the above-identified patent and that said Letters Patent is hereby corrected as shown below:

IN THE SPECIFICATION

At column 6, line 53, after the words "User-Network", delete "scenario-CO" and insert therefor --scenario-C0--.

Signed and Sealed this

Twenty-fifth Day of December, 2007

JON W. DUDAS
*Director of the United States Patent and Trademark Office*